(12) United States Patent
Kim et al.

(10) Patent No.: US 9,090,764 B2
(45) Date of Patent: Jul. 28, 2015

(54) POLYMER PREPARING METHOD AND POLYMER PREPARED BY THE SAME

(71) Applicant: LG CHEM, LTD., Seoul (KR)

(72) Inventors: Su Jeong Kim, Daejeon (KR); Jeong Ae Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/073,501

(22) Filed: Nov. 6, 2013

(65) Prior Publication Data

US 2014/0066573 A1  Mar. 6, 2014

Related U.S. Application Data

(63) Continuation of application No. PCT/KR2013/004972, filed on Jun. 5, 2013.

(30) Foreign Application Priority Data

Jun. 5, 2012 (KR) .......... 10-2012-0060579
Jun. 5, 2013 (KR) .......... 10-2013-0064572

(51) Int. Cl.
  *C08L 27/16* (2006.01)
  *C08F 259/08* (2006.01)
  *C08F 2/38* (2006.01)
  *C08F 259/00* (2006.01)
  *C08F 4/40* (2006.01)

(52) U.S. Cl.
  CPC . *C08L 27/16* (2013.01); *C08F 2/38* (2013.01); *C08F 4/40* (2013.01); *C08F 259/00* (2013.01); *C08F 259/08* (2013.01); *C08F 2438/00* (2013.01); *C08F 2438/01* (2013.01)

(58) Field of Classification Search
  CPC ............... C08F 259/00; C08F 2438/01; C08F 2438/00; C08L 27/16
  USPC ........................................................ 525/199
  See application file for complete search history.

(56) References Cited

U.S. PATENT DOCUMENTS

| | | | |
|---|---|---|---|
| 6,576,722 B2 * | 6/2003 | Coca et al. .................... | 526/111 |
| 7,893,174 B2 * | 2/2011 | Matyjaszewski et al. .... | 526/111 |
| 2007/0276101 A1 | 11/2007 | Matyjaszewski et al. | |

FOREIGN PATENT DOCUMENTS

| | | |
|---|---|---|
| CN | 101379091 A | 3/2009 |
| JP | 2004-210858 | 7/2004 |
| JP | 2008-266658 | 11/2005 |
| JP | 2007-527463 | 9/2007 |
| KR | 10-2011-0049353 | 5/2011 |
| WO | 2012-012705 | 1/2012 |

* cited by examiner

*Primary Examiner* — Nathan M Nutter
(74) *Attorney, Agent, or Firm* — McKenna Long & Aldridge, LLP

(57) ABSTRACT

Provided is a polymer preparing method. By additionally inputting a catalytic reducing agent that reduces an inactivated metal complex compound catalyst to an activated metal complex compound catalyst, a polymer polymerized at a high conversion ratio of a monomer can be provided.

14 Claims, 2 Drawing Sheets

POLYMER PREPARING METHOD AND POLYMER PREPARED BY THE SAME

This application is a Continuation Bypass of International Application No. PCT/KR2013/004972, filed Jun. 5, 2013 and, claims priority to and the benefit of Korean Patent Application Nos. 10-2012-0060579, filed on Jun. 5, 2012, and 10-2013-0064572, filed on Jun. 5, 2013, the disclosures of which are incorporated herein by reference in their entirety.

BACKGROUND

1. Field of the Invention

The present invention relates to a polymer preparing method and a polymer prepared by the same.

2. Discussion of Related Art

Hydrophobic polymers such as fluorine-containing polymers or olefin-based polymers have been applied to various fields such as membranes, filters, binder polymers for batteries, pipe products, and optical films for a display due to their excellent chemical, mechanical, and thermal stabilities. However, when these hydrophobic polymers are applied to such fields, it is not easy to control hydrophobic levels of the polymers. As for a linear polymer, applicable processes are limited due to its structural property. Thus, there have been carried out researches on modification of chemical and structural properties of polymers, such as researches on graft polymerization for introducing a hydrophilic monomer to a side chain of a hydrophobic linear polymer.

For example, as an attempt to introduce a monomer to a side chain of a linear polymer, that is, as graft polymerization, graft-from polymerization in which a hydrophobic polymer contains a halogen activating group such as chlorine and various monomers are polymerized by using the activated group is known to be efficient.

Specifically, in the graft-from polymerization, when a halogen activating group such as chlorine leaves, radicals are generated. As a catalyst for bonding the halogen to an activating group, a metal/ligand complex compound may be used. As suitable metal/ligand complex compounds, complex compounds of, for example, Cu, Ru, Fe, Ni, Zn, and the like may be used. As the copper/ligand complex compound most widely used among them, a copper/ligand complex compound can be used. It is known that when the copper/ligand complex compound is bound to the halogen activating group, its activated form is known as Cu(I)X/L (X represents a halide and L represents a ligand).

Atom Transfer Radical Polymerization (hereinafter, referred to as "ATRP") is known as polymerization using the Cu(I)X/L as a catalyst. However, in the case of polymerization, according to the ATRP, when a chlorine group in a hydrophobic polymer is activated by using an ATRP mechanism, a great amount of the Cu(I)X/L needs to be used due to low reaction initiation efficiency, and thus, it may be difficult to remove a catalyst compound after the reaction. In order to adjust a length of a polymer chain grafted by using the ATRP, initiation efficiency of a halogen site in a halogenated hydrophobic polymer may be adjusted. In this case, by reducing an amount of the metal catalyst used to slow down an initiation rate, initiation efficiency can be low and a long polymer chain can be formed. However, according to the ATRP, when an amount of the catalyst is small, an inactivation reaction mainly occurs. Thus, an initiation rate is remarkably reduced and an initiation reaction may not occur or may occur at a very low reaction rate. Further, after the initiation, the polymer chain may be grown at a very low growth rate, so that the polymerization may be ended with a low conversion ratio. On the contrary, when an amount of the catalyst used is increased, an initiation reaction occurs at too many sites in the halogenated hydrophobic polymer, so that the polymer chain generates heat and gelates due to a coupling phenomenon of the halogenated hydrophobic polymer, and thus, the polymer chain cannot be grown.

Therefore, there has been suggested an Activators Regenerated by Electron Transfer-ATRP (hereinafter, referred to as "ARGET-ATRP") in which $Cu(II)X_2$ is used as a catalyst instead of the Cu(I)X/L and a catalytic reducing agent is input together in the initial stages or Single Electron Transfer-Living Radical Polymerization (hereinafter, referred to as "SET-LRP") in which Cu(0) is used as both a catalyst and a catalytic reducing agent.

FIG. 1 is a schematic diagram of a suggested mechanism of the SET-LRP.

As shown in FIG. 1, an initiation step ($k_{act}$) is mediated by a single electron transfer from an electron donor that donates electrons to an electron acceptor (halogenated polymer compound, $P_n$—X) that accepts electrons. The electron donor may be, for example, Cu(0). The Cu(0) is known as an effective single electron donor. Cu(I) species generated during the initiation step can be disproportionated immediately and spontaneously into Cu(II) and Cu(0) species. The Cu(II) species generated from the disproportionation reaction as an inactivated catalyst with extremely high reactivity offers reversible inactivation ($k_{deact}$) to potentially alkyl halide species ($P_n$—X) of generated radicals ($P_n\cdot$) and are reduced to the Cu(I) species as an activated catalyst. During reaction conditions that favor the disproportionation of the Cu(I) species into the Cu(II) species and Cu(0) species, the lifetime of Cu(I)X is very short in comparison with those of $Cu(II)X_2$ and Cu(0). Therefore, SET catalytic activity of Cu(I)X may be neglected (X represents a halogen element).

When an activation rate constant of the alkyl halide species ($P_n$—X) is high, it may be difficult to control a polymerization rate. Thus, in order to control an initiation reaction, even a small amount of the Cu(II) species as an inactivated catalyst species may be input together.

In the case of polymerization using the SET-LRP, initiation efficiency is low in comparison with growth efficiency of a chain. Therefore, an initiation reaction of a halogenated hydrophobic polymer proceeds relatively slowly as compared with the ATRP, and thus, a relatively long polymer chain may be formed. Further, a polymerization rate is also high as compared with the ATRP, and thus, a polymer having a high conversion ratio may be prepared.

FIG. 2 is a graph illustrating changes in polymerization rate and molecular weight based on comparison between polymerization using the SET-LRP and polymerization using the ARGET-ATRP.

Referring to FIG. 2, in the case of the polymerization using the SET-LRP, even though a very small amount of a catalyst is used as compared with the polymerization using the ARGET-ATRP, a reaction may be initiated with efficiency, and thus, it is easy to remove the catalyst after the reaction. Further, the SET-LRP may be carried out with lower activation energy at a lower temperature and may have higher overall polymerization efficiency as compared with the polymerization using the ARGET-ATRP.

However, in the case of graft polymerization using the SET-LRP, a growth reaction ($k_{act}$) of a polymer actively occurs, so that a concentration of radicals generated is increased. Thus, a reaction rate of a stop reaction ($k_t$) is remarkably increased and the Cu(II) species as an inactivated catalyst species are accumulated. Therefore, the polymerization may be ended at a low conversion ratio of a monomer to be polymerized.

SUMMARY OF THE INVENTION

The present application is directed to providing a polymer preparing method and a polymer prepared by the method.

The present application relates to a polymer preparing method. For example, the polymer preparing method includes bringing a catalyst, a ligand, a halogenated polymer compound, and a polymeric monomer into contact with one another; and additionally inputting a catalytic reducing agent.

The bringing the catalyst, the ligand, the halogenated polymer compound, and the polymeric monomer into contact with one another may include mixing and bringing materials used for polymerization by Single Electron Transfer-Living Radical Polymerization (hereinafter, referred to as "SET-LRP") into contact with each other to make a polymerization reaction. In the present specification, the term "radical polymerization" means the polymerization in which radicals are formed and function as chain carriers during the polymerization. Further, the term "single electron transfer-living radical polymerization" used herein means radical polymerization mediated by a single electron transfer from a catalyst as an electron donor that donates electrons to a halogenated polymer compound as an electron acceptor that accepts electrons by bringing the halogenated polymer compound as the electron acceptor into contact with a monomer to be polymerized under presence of the catalyst and a ligand unless context dictates otherwise.

In the present application, by preparing a polymer using the SET-LRP, even though a very small amount of a catalyst is used, a polymer may be prepared with a very high conversion ratio. Further, since a catalyst in the form of Cu(0) is used, it is easy to remove a remaining catalyst after the polymerization. In other words, unlike the Cu(I) species and the Cu(II) species that cause an inner-sphere single electron transfer reaction, when the Cu(0) as a catalyst in the form of powder, beads, granules, or the like is input as the species that cause an out-sphere single electron transfer reaction, a reaction occurs on a surface of the Cu(0) catalyst bound to the ligand, and thus, it is easy to remove the remaining Cu(0) catalyst after the reaction.

Further, an initiation reaction in the SET-LRP is relatively slow as compared with the above-described ATRP, and thus, it is easy to control the polymerization. Furthermore, an initiation reaction is initiated at fewer sites than the ATRP, and thus, it is possible to polymerize a longer graft chain with respect to an input amount of the same monomer.

In an example, the polymer preparing method includes additionally inputting a catalytic reducing agent.

For example, during polymerization using the SET-LRP, when a conversion ratio of the monomer reaches a certain level, by additionally inputting the catalytic reducing agent, activity of the catalyst is maintained to continue the reaction.

For example, when a conversion ratio of the monomer is 10% or more, 20%, and 40% or more, the catalytic reducing agent may be additionally input. The catalytic reducing agent may be input without limitation as long as it is determined that a conversion ratio of the monomer is 10% or more and a normal initiation reaction is initiated. When it is determined that the catalyst loses the activity considering a half-life of the catalytic reducing agent used, the above step may be carried out repeatedly at least once or more to maintain the activity of the catalyst. A conversion ratio of the monomer may be measured by various methods at any time during the polymerization. For example, a conversion ratio may be measured by comparing relative values of peaks induced by the monomer based on an inner reference material within a reaction solution by a Nuclear Magnetic Resonator (NMR).

When the catalytic reducing agent is input, a reaction system may be maintained at a temperature higher than an initial temperature and may be maintained at, for example, 40° C. or more. By maintaining the reaction system at a high temperature, activity of the additionally input catalytic reducing agent may be promoted.

Further, the catalytic reducing agent may be input in an amount of 10 parts to 2000 parts by weight with respect to 100 parts by weight of the catalyst. When the catalytic reducing agent is totally input in an amount of 10 parts by weight or more, the activity of the catalyst may be maintained, and when the catalytic reducing agent is input in an amount of 2000 parts by weight or less, an unexpected side reaction caused by the input catalytic reducing agent may not occur. The side reaction may not occur depending on a characteristic of the catalytic reducing agent used. For example, a thermal initiator such as 2,2'-azobis(2-methylpropionitrile (hereinafter, referred to as "AIBN") and peroxide acts as the above-described catalytic reducing agent and also acts as a new initiator that generates its own radicals, and thus, an unexpected linear polymer may be formed and a severe exothermic reaction may occur. For example, when an inorganic reducing agent is used, a metal content present in a finally prepared polymer may be high. The catalytic reducing agent may be input at once or several times as long as it is input in an amount of 10 parts to 2000 parts by weight with respect to 100 parts by weight of the catalyst.

By additionally inputting the catalytic reducing agent, a polymerization rate is not remarkably decreased at late stages of the reaction and the reaction is less affected by a growth reaction rate of the monomer to be graft-polymerized, and thus, it is possible to efficiently prepare polymers by using various monomers having polymerizable functional groups.

The catalytic reducing agent may be input during the polymerization reaction in addition to the copper (Cu(0)) having an oxidation number of 0 as a catalyst acting as a catalytic reducing agent in the SET-LRP and may reduce an inactivated metal complex compound catalyst (Cu(II)$X_2$/L, or the like) to an activated metal complex compound catalyst (Cu(I)X/L, or the like).

In an example, the catalytic reducing agent may include various reducing agents as long as they are electron donors capable of donating electrons and may include, for example, an organic reducing agent or an inorganic reducing agent, and preferably, an organic reducing agent.

For example, the organic reducing agent may include at least one selected from the group consisting of peroxides, azo compounds, ascorbic acid, monosaccharide compounds, phenol compounds, amine compounds, and hydrazine compounds. Among these materials, considering an electron-donating ability, a material having an electron-donating ability by which Cu(II) can be reduced to Cu(I) may be used. When the organic reducing agent is used, a metal content present in a finally prepared polymer may be minimized.

The peroxides may include, for example, but are not limited to, benzoyl peroxide, 1,1-bis(tert-butylperoxy)-3,3,5-triethylcyclohexane, tert-butylperoxyacetate, tert-butylperoxybenzoate, tert-butylperoxy-2-ethylhexanoate, tert-butylperoxyisopropylcarbonate, di-2-ethylhexylperoxydicarbonate, diisopropylperoxy dicarbonate, di-3-methoxybutylperoxy dicarbonate, di-3,3,5-trimethylhexanoyl peroxide, di-tert-butyl peroxide, lauroyl peroxide, dicumylperoxide, methylethylketone peroxide, butyl hydro peroxide, or cumyl hydro peroxide.

In an example, the azo compounds may include, but are not limited to, azodicarbonamide, azobenzene, azobisisobutylonitrile 2,2'-azobis(2-methylpropionitrile) 2,2'-azobis(4-methoxy-2,4-dimethyl valeronitrile), dimethyl 2,2'-azobis(2-methyl propionate), 2,2'-azobis(N-cyclohexyl-2-methyl propionate), 2,2-azobis(2,4-dimethyl valeronitrile), 2,2'-azobis(2-methyl butyronitrile), 2,2'-azobis[N-(2-propenyl)-2-methylpropionate], 2,2'-azobis(N-butyl-2-methylpropionate), 2,2'-azobis[N-(2-propenyl)-2-methylpropionate], 1,1'-azobis(cyclohexane-1-carbonitrile), or 1-[(cyano-1-methylethyl)azo] formamide.

The monosaccharide compounds may include, for example, trioses such as dihydroxyacetone and glyceraldehyde; tetroses such as erythrulose, erythrose, and threose; pentoses such as ribulose, xylulose, ribose, arabinose, xylose, lyxose, and deoxyribose; hexoses such as psicose, fructose, sorbose, tagatose, allose, altrose, glucose, mannose, gulose, idose, galactose, talose, fucose, fuculose, and rhamnose; and heptoses such as sedoheptulose and may include other octoses or nonoses such as neuraminic acid.

The phenol compounds may be employed from publicly-known compounds containing a phenol group in various ways and may include, for example, but are not limited to, 4-propylphenol, 4-butylphenol, 4-tert-butylphenol, 4-pentylphenol, 4-tert-pentylphenol, 4-hexylphenol, 4-tert-octylphenol, 4-phenylphenol, nonylphenol, 2,6-di-tert-butyl-p-cresol, 2,4,6-tri-tert-butyl phenol, 2,6-di-phenyl phenol, 2,4-di-tert-butyl phenol, 2-tert-butyl-4-methyl phenol 4-(3,4-dihydroxyphenoxy)benzene-1,2-diol, 2-bromo-4,5-dihydroxyphenyl (3,4-dihydroxyphenyl)ether, bis(2-bromo-4,5-dihydroxyphenyl)ether, bis(2,3-dibromo-4,5-dihydroxyphenyl)ether, bis(3,4-dihydroxyphenyl)methanone, bis(3-bromo-4,5-dihydroxyphenyl)methanone, (3-bromo-4,5-dihydroxyphenyl)(2,3-dibromo-4,5-dihydroxyphenyl)methanone, 4-(3,4-dihydroxyphenethyl)benzene-1,2-diol, 2,2'-dibromo-4,4',5,5'-tetrahydroxybibenzyl, or 2,2',3-tribromo-4,4',5,5'-tetrahydroxybibenzyl.

The amine compounds may include, for example, but are not limited to, dimethylamine, ethylamine, diethylamine, triethylamine, diphenylamine, ethanolamine, tert-butylamine, cyclohexylamine, 4,4-dimethylcyclohexanamine, N,N-dimethylpropylamine, N-ethyl-N-methylcyclohexylamine, N-methyl-2-pentanamine, 2-aminobutanoic acid, 3-aminobutanoic acid, 1-amino-3-pentanone, 2-methylaminoethanol, 2,4-diaminobenzoic acid, 4-amino-2-butanone, aniline, aminoethane, 2-aminopentane, 1-methylaminopropane, or 1-(ethylmethylamino)propane.

The hydrazine compounds may include, for example, but are not limited to, hydrazine, hydrazine hydrochloride, phenylhydrazine, hydrazine sulfate, or hydrazobenzene.

Further, as described above, the inorganic reducing agent may be employed from publicly-known inorganic materials as long as they are electron donors capable of donating electrons and may include, for example, but is not limited to, metal compounds or zerovalent metals.

In an example, the metal compounds may include, but are not limited to, zinc dioctanoate, and the like and the zero valent metals may include transition metals having an oxidation number of 0, for example, but are not limited to, copper (Cu), iron (Fe), cobalt (Co), nickel (Ni), ruthenium (Ru), molybdenum (Mo), and the like.

In an example, the catalyst used in the SET-LRP may include, for example, but is not limited to, one or more selected from the group consisting of Cu(0), Fe(0), $Cu_2Te$, $Cu_2Se$, $Cu_2S$, and $Cu_2O$, and preferably, Cu(0).

Further, in an example, the catalyst may include an inactivated catalyst, for example, $Cu(II)X_2$, having a high oxidation number of metal ions. The inactivated catalyst may be included in the catalyst for controlling the initiation reaction. The inactivated catalyst may be included in a range of 1% by weight to 50% by weight with respect to the total amount of the catalyst.

Furthermore, the $Cu(II)X_2$ may be included in the catalyst such that Cu(II) satisfies an equivalence ratio in a range of 0 to 20 mol % with respect to the total molar amount of copper atoms in the input catalyst.

According to another exemplary embodiment of the polymer preparing method of the present application, mixing and polymerizing may be included.

The mixing may be forming a mixture by mixing the materials to be used for preparing the polymer. For example, the mixing may be mixing the polymer compound, the polymeric monomer to be polymerized, the catalyst, and the ligand with a solvent.

The polymer compound serves as a main chain of the polymer. For example, the polymer compound may be a halogenated polymer compound containing halogenated parts as a result of substitution of some elements by halogen elements so as to be polymerized by the above-described SET-LRP.

The halogenated polymer compound may include polymers of monomers such as ethylene halide, propylene halide, and vinylidene halide, or their copolymers. Specifically, the halogenated polymer compound may include, but is not limited to, polyvinylidene fluoride, polyvinylidene chloride, trifluoropolyethylene, tetrafluoropolyethylene, hexafluoropolyethylene, 1,2-difluoropolyethylene, chlorofluoropolyethylene, polyethylene chloride, or polypropylene chloride, polyvinylidene fluoride-co-chlorotrifluoroethylene, polyvinyl chloride, polychlorotrifluoroethylene, polydichlorodifluoromethane, polyvinylidenedichloride, or copolymers of two or more of the foregoing polymer compounds.

Further, the polymeric monomer to be polymerized may be, for example, a part to be introduced into a side chain of the polymer. In an example, the monomer may have a polymerizable functional group.

In an example, the polymeric monomer having a polymerizable functional group may include, for example, an unsaturated vinyl group and may be a monomer which can be polymerized by radical polymerization, and may include, for example, but is not limited to, alkyl(meta)acrylate having 1 to 12 carbon atoms, styrene, cycloalkyl(meta)acrylate having 1 to 12 carbon atoms, sulfoalkyl(meta)acrylate having 1 to 12 carbon atoms, acrylo nitrile, polyoxyethylene(meta)acrylate, poly(ethyleneglycol)methylether(meta)acrylate, (2-acetoacetoxy)ethyl (meta)acrylate, (meta)acrylamide, N-vinylpyrrolidone, or their derivatives.

Further, the catalyst may be the same as the above-described catalyst and may be employed from various forms of catalysts publicly known in the art. By way of example, the catalyst may be in the form of but is not limited to, powder, wire, or mesh.

In an example, the catalyst may include, for example, but is not limited to, one or more selected from the group consisting of Cu(0), Fe(0), $Cu_2Te$, $Cu_2Se$, $Cu_2S$, and $Cu_2O$, and preferably, Cu(0).

Further, in the mixing, the catalyst may include an inactivated catalyst, for example, $Cu(II)X_2$, having a high oxidation number of metal ions. The inactivated catalyst may be included in the catalyst to control the initiation reaction. The inactivated catalyst may be included in a range of 1% by weight to 50% by weight with respect to the total amount of the catalyst.

Furthermore, the Cu(II)X$_2$ may be included in the catalyst such that Cu(II) satisfies an equivalence ratio in a range of 0 to 20 mol % with respect to the total molar amount of copper atoms in the input catalyst.

Moreover, the ligand may include, for example, but is not limited to, 2,2'-bipyridine, triphenylphosphine, alkyl-2,2'-bipyridine, 4,4-dinonyl-2,2'-bipyridine, 4,4-dihepthyl-2,2'-bipyridine, tris(2-aminoethyl)amine, tris[2-(dimethylamino)ethyl]amine, tris[(2-pyridyl)methyl]amine, N,N,N',N',N''-pentamethyldiethylenetriamine, 1,1,4,7,10,10-hexamethyltriethylentetramine, or tetramethylethylenediamine.

Besides, the solvent may be employed from various solvents publicly known in the art. For example, the solvent may include, but is not limited to, N-methyl-2-pyrrolidone (NMP), gamma-butyrolactone (GBL), dimethylformamide (DMF), dimethylacetamide (DMAc), or tetrahydrofuran (THF).

In an example of the polymerizing, the polymeric monomer having a polymerizable functional group may be polymerized with a halogenated polymer compound as a main chain of the copolymer by the above-described SET-LRP.

In an example of the polymerizing, a catalyst reducing may be included.

Through the catalyst reducing, a catalytic reducing agent may be further input in addition to a catalyst acting as a catalytic reducing agent, for example, Cu(0) so as to reduce an inactivated metal complex compound catalyst (Cu(II)X$_2$/L, or the like) to an activated metal complex compound catalyst (Cu(I)X/L, or the like). An effect thereof is the same as described above.

Further, in an example, the polymerizing may be carried out at a temperature in a range of 25 to 200° C. for 0.1 to 100 hours.

In an example of the copolymer preparing method, a reaction terminating may be further included after the polymerizing. Through the reaction terminating, the polymerized compound is exposed to oxygen or contacted with oxygen such that the reaction does not proceed any more after the polymerizing.

Still another exemplary embodiment of the present application relates to a polymer prepared by the above-described polymer preparing method of the present application.

A polymer prepared by the polymer preparing method has a conversion ratio higher than that of a monomer polymerized by the conventional SET-LRP by about 5 to about 30%.

Further, in an example, the polymer may satisfy the following Formula 1.

$$E<20\%  \quad \text{[Formula 1]}$$

In Formula 1, E represents initiation efficiency measured at a conversion ratio of 59% after 19 hours from initiation of polymerization under presence of 500 ppm of a catalyst.

The initiation efficiency means a ratio of actual initiation sites to the total initiable sites. For example, the E may be represented by the following Formula 1.

$$E=[b/(a+b)]\times 100 \quad \text{[Formula 1]}$$

In Formula 1, a+b represents initiable sites in a fluorine-based polymer, for example, the number of total halogen elements, and b represents the number of sites which are involved in an actual reaction and of which halogen elements are substituted.

The initiation efficiency may be measured by various methods, for example, by using a Nuclear Magnetic Resonator (NMR).

As compared with polymers polymerized by other polymerization methods, the polymer prepared by the polymer preparing method of the present application has low initiation efficiency at the same conversion ratio and thus satisfies the above Formula 1. Therefore, according to the present application, it is possible to prepare a polymer having a high weight average molecular weight at the same conversion ratio as compared with the polymers polymerized by other polymerization methods. In other words, as compared with the conventional ATRP, in the polymerization of the present application, an initiation reaction is initiated at fewer sites, and thus, it is possible to polymerize a longer graft chain with the same input amount of a monomer. Therefore, it is possible to provide a polymer having a very high weight average molecular weight.

DETAILED DESCRIPTION OF EXEMPLARY EMBODIMENTS

Figure 1:
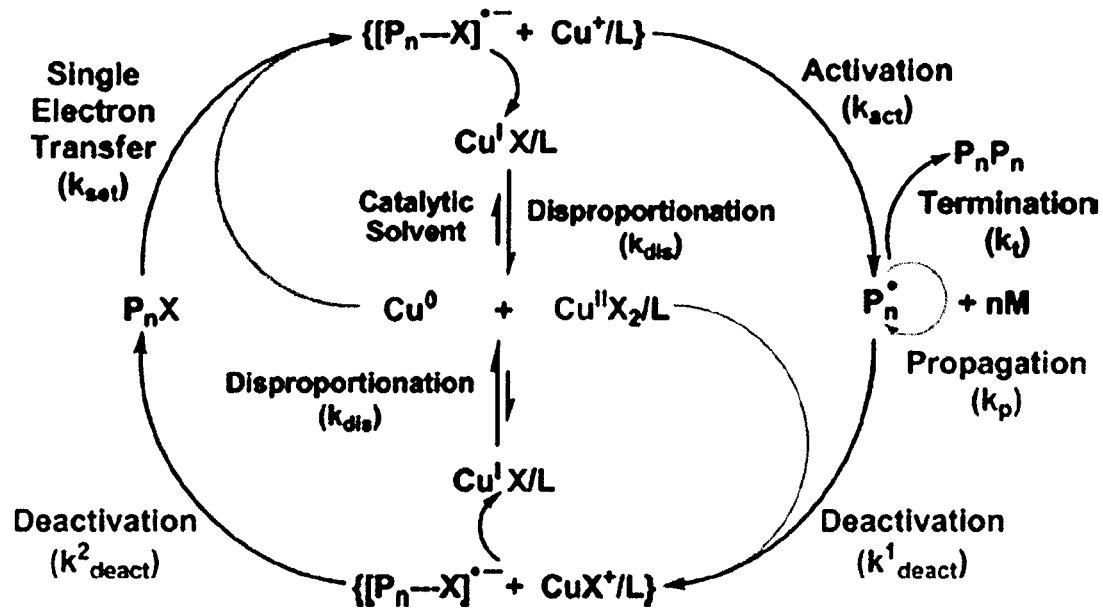
FIG. 1 is a schematic diagram illustrating a suggested mechanism of SET-LRP used in the present invention.
Figure 2:
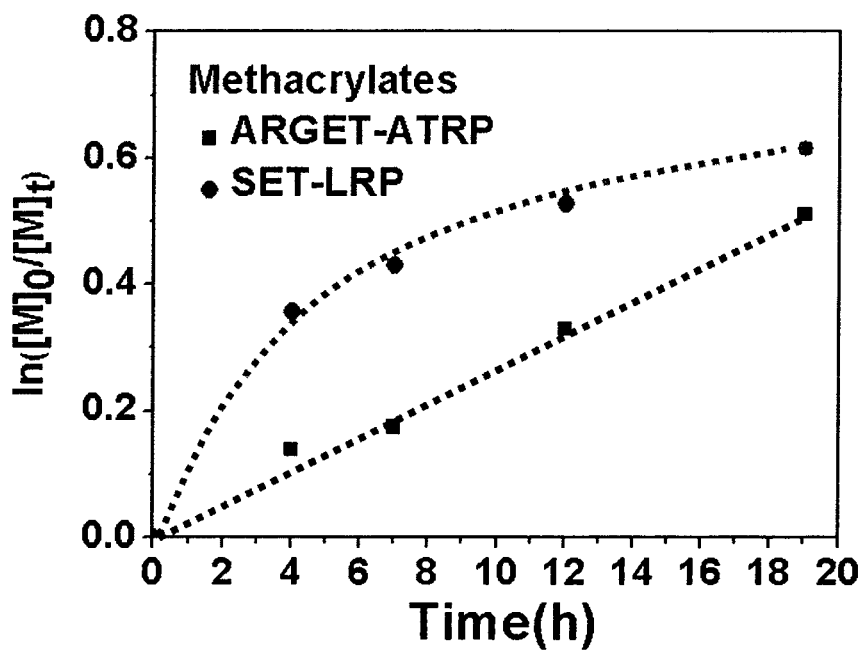
FIG. 2 is a graph illustrating changes in polymerization rate and molecular weight based on comparison between polymerization using SET-LRP and polymerization using ARGET-ATRP.

Hereinafter, the present invention will be described in further detail with reference to an example according to the present invention and comparative examples not according to the present invention. However, the present invention is not limited to Example to be disclosed below.

Measurement of Conversion Ratio

A conversion ratio during graft polymerization was calculated by the following Formula 2 according to a measurement result of 1H-NMR.

<Measurement Conditions>

Analysis instrument: 500 MHz NMR (Varian Unity Inova 500), 1H-NMR

Concentration: 5 to 10 mg/ml, Solvent: DMSO-d6

Temperature: 25° C.

$$\text{Conversion ratio (\%) of monomer} = 100 \times (1 - A_t/A_0) \quad \text{[Formula 2]}$$

In Formula 2, $A_0$ represents an area of a peak (around 5.5 ppm to 6.7 ppm) induced by =CH$_2$ at a double bond terminal of a monomer, with internal reference to an area of a peak (around 2.7 ppm to 3.3 ppm) induced by a unit —CF$_2$CH$_2$- contained in a halogenated polymer compound within a solution before a reaction, in a 1H-NMR spectrum, and $A_t$ represents an area of a peak at a double bond terminal of a monomer with reference to a halogenated polymer compound in a solution reacted for a time period t.

In other words, by relatively comparing a decreased amount of the peak induced by =CH$_2$ of the monomer with internal reference to the peak induced by the halogenated polymer compound which was not changed over time, a conversion ratio of the monomer was calculated.

Measurement of Weight Average Molecular Weight

A weight average molecular weight of a composite was measured under the following conditions by using a GPC. A calibration curve was prepared by using standard polystyrene of Agilent system and a measurement result was converted.

<Weight Average Molecular Weight Measurement Conditions>

Measuring device: Agilent GPC(Agilent 1200 series, US)
Column: Connect 2 PL mixed B
Column temperature: 40° C.
Eluent: Tetrahydrofuran
Flow velocity: 1.0 mL/min
Concentration: up to 1 mg/mL (50 μL injection)
Measurement of Initiation Efficiency Initiation efficiency was calculated by the following Formula 3 and converted at a conversion ratio of 59% after 19 hours from initiation of polymerization under presence of 500 ppm of a catalyst.

<Measurement Conditions>

Analysis instrument: 500 MHz NMR (Varian Unity Inova 500), 1H-NMR
Concentration: 5 to 10 mg/ml, Solvent: DMF-d6
Temperature: 25° C.

$$\text{Initiation efficiency (\%)} = 100 \times (A_t/A_0) \qquad \text{[Formula 3]}$$

Initiation efficiency was calculated based on a decreased amount of a peak area induced by a unit —ClCF— within the solution reacted for a time period t with respect to a peak area around −107.3 ppm to −107.9 ppm or around −119.1 ppm to −120.6 ppm induced by the unit —ClCF— within the solution before the reaction with internal reference to a peak around −90 ppm to −92 ppm induced by —CF$_2$ of a halogenated polymer. That is, with internal reference to —CF$_2$— having the same peak area before and after the reaction, by relatively comparing a peak movement of an F element of the unit —ClCF— in response to initiation of —Cl, initiation efficiency was calculated.

EXAMPLE

Preparation of 31508-g-metaacrylate Polymerized by Using SET-LRP with Additional Input of a Catalytic Reducing Agent 15 g of polyvinylidene fluoride-co-chlorotrifluoroethylene (hereinafter referred to as "PVDF-co-PCTFE", number average molecular weight (hereinafter, referred to as "Mn")=180000, distribution of molecular weight (hereinafter, referred to as "PDI")=1.47, 15% polychlorotrifluoroethylene (hereinafter, referred to as "pCTFE"), chlorine (Cl)=5.68% by weight, product name: Solef.31508, manufacturer: Solvay) as a halogenated polymer, 20.5 g of butyl methacrylate (hereinafter, referred to as "BMA"), 3.8 g of acrylonitrile (hereinafter, referred to as "AN"), 2.6 g of (2-acetoacetoxy) ethyl methacrylate (hereinafter, referred to as "AAEMA"), 1.6 g of hydroxyethyl methacrylate (hereinafter, referred to as "HEMA") (weight ratio of BMA:AN:AAEMA:HEMA=60:30:5:5) as monomers to be polymerized, 15.3 mg of Cu(0) powder as a catalyst, 5.4 mg of Cu(II)Br$_2$ as a deactive species serving as an initiator for effectively initiating a reaction, 59.6 mg of N,N,N',N'',N''-pentamethyldiethylenetriamine (PMDETA) as a ligand, and 147.7 g of N,N-dimethylformamide (DMF) as a solvent were put into a 500 ML round bottom flask, and the flask was sealed. Then, in order to remove oxygen in a solution, nitrogen was bubbled for 30 minutes or more. Thereafter, the flask containing the solution was immersed in an oil bath of 70° C. and stirred for 6 hours and 12 hours. Then, 0.6 g (500 parts by weight of the AIBN with respect to 100 parts by weight of the catalyst Cu(II)Br$_2$) of a 5% 2,2'-Azobis(2-methylpropionitrile) (hereinafter, referred to as "AIBN") solution as a catalytic reducing agent was added once 6 hours later (conversion ratio: 32%) and once 12 hours later (conversion ratio: 47%). Thereafter, with stirring for 19 hours in total, the flask was heated. The flask was opened in order for the solution to be exposed to oxygen, and the reaction was ended. As a result, 19 hours later, a graft copolymer containing the monomers including the AN having a conversion ratio of 48%, the methacrylates having a conversion ratio of 59%, and 40 w % of the PVDF-co-PCTFE having a weight average molecular weight (hereinafter, referred to as "Mw") of $6.5e^{+5}$ g/mol was prepared. An Mw measured at a conversion ratio of 40% of the monomers methacrylates of the copolymer was $5.35e^{+5}$ g/mol, and initiation efficiency measured at a conversion ratio of 59% of the monomers methacrylates of the copolymer was 7%.

Comparative Example 1

Preparation of 31508-g-metaacrylate Polymerized by Using ARGET-ATRP 15 g of PVDF-co-PCTFE (Mn=180000, PDI=1.47, 15% CTFE, Cl=5.68% by weight) as a halogenated polymer, 20.5 g of BMA, 3.8 g of AN, 2.6 g of AAEMA, 1.6 g of HEMA (weight ratio of BMA:AN:AAEMA:HEMA=60:30:5:5) as polymeric monomers, 11.8 mg of Cu(II)Br$_2$ as a catalyst, 168 mg of tris(2-pyridylmethyl)amine (TPMA) as a ligand, 0.321 g of tin(II) 2-ethylhexanoate (Sn(EH)$_2$) as a catalytic reducing agent, and 88.6 g of DMF as a solvent were put into a 500 ML round bottom flask, and the flask was sealed. Then, in order to remove oxygen in a solution, nitrogen was bubbled for 30 minutes or more. Thereafter, the flask containing the solution was immersed in an oil bath of 70° C., and with stirring for 19 hours in total, the flask was heated. The flask was opened in order for the solution to be exposed to oxygen, and the reaction was ended. As a result, a graft copolymer containing the monomers including the AN having a conversion ratio of 31%, the methacrylates having a conversion ratio of 40%, and 60 w % of the PVDF-co-PCTFE having an Mw of $3.92e^{+5}$ g/mol was prepared. Initiation efficiency measured at a conversion ratio of 40% of the monomers methacrylates of the copolymer was 43%.

Comparative Example 2

Preparation of 31508-g-metaacrylate Polymerized by Using SET-LRP

A graft copolymer containing monomers including AN having a conversion ratio of 39%, methacrylates having a conversion ratio of 46%, and 50 w % of the PVDF-co-PCTFE having an Mw of $4.55e^{+5}$ g/mol was prepared in the same manner as Example except that AIBN as a catalyst reducing agent of Example was not used herein. Initiation efficiency measured at a conversion ratio of 46% of the monomers methacrylates of the copolymer was 10%. An Mw measured at a conversion ratio of 40% of the monomers methacrylates of the copolymer was $4.37e^{+5}$ g/mol.

Comparative Example 3

Polymerization reaction was ended about 2 hours later in the same manner as Example except that AIBN as a catalytic reducing agent was additionally input 40 hours after initiation of the reaction (conversion ratio: 6%). In this case, as a polymer was gelated with an exothermic reaction, the reaction solution was changed to be opaque. Therefore, a conversion ratio, a molecular weight, and initiation efficiency of the copolymer could not be measured.

Figure 3:
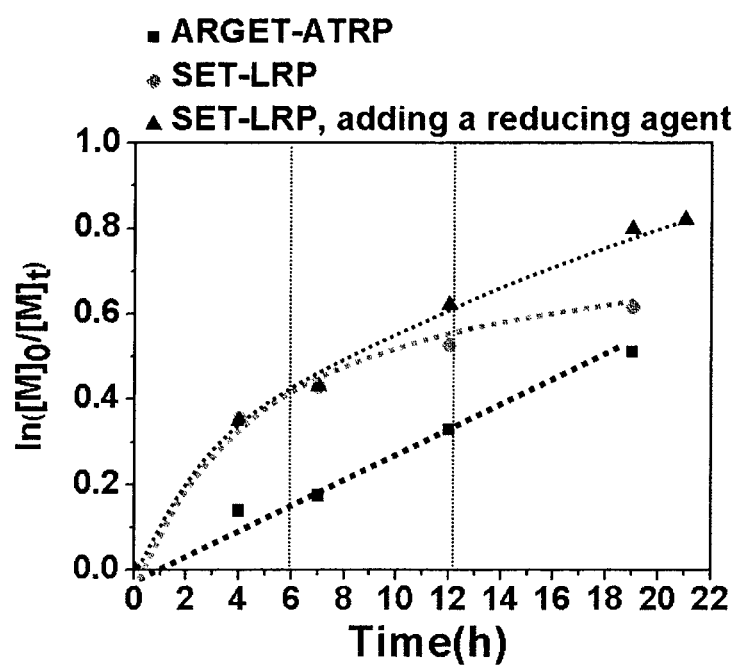
FIG. 3 is a graph illustrating changes in polymerization rate and molecular weight based on comparison among polymerization using SET-LRP with additional input of a catalytic reducing agent, polymerization using the SET-LRP without additional input of the catalytic reducing agent, and polymerization using ARGET-ATRP.

FIG. 3 is a graph illustrating changes in polymerization rate and molecular weight based on comparison among polymerization using SET-LRP with additional input of a catalytic reducing agent, polymerization using the SET-LRP without additional input of the catalytic reducing agent, and polymerization using ARGET-ATRP in which Cu(II)X$_2$ as a catalyst was input in the initial stages and tin(II) 2-ethylhexanoate (Sn(EH)$_2$) as a catalytic reducing agent was input in the initial stages.

As shown in FIG. 3, it can be seen that when a catalytic reducing agent was additionally input once 6 hours later and once 12 hours later, a molecular weight measured at each time point was higher than that of a copolymer prepared by using the conventional SET-LRP or ARGET-ATRP. Therefore, it can be seen that polymerization was ended at a high conversion ratio. Further, it is shown that in the case of polymerization by using the ARGET-ATRP in which a catalytic reducing agent was input in the initial stages and Cu(II) was reduced to Cu(I), an initiation rate was low, and, thus, polymerization efficiency was low. When a polymer was prepared by using the typical SET-LRP, a polymerization rate of a monomer AN was very high. Thus, if the AN is copolymerized with another monomer, it may be difficult to control a polymerization rate or it may be impossible to prepare an alternating copolymer. For example, as shown in FIG. 3, a polymerization rate is gradually saturated and a conversion ratio is not increased any more. However, according to the polymer preparing method of the present application, by additionally inputting a reducing agent, it is possible to prevent saturation of a polymerization rate and also possible to increase a conversion ratio.

Meanwhile, according to Comparative Example 3 in which the catalytic reducing agent was input before a conversion ratio reached 10%, a growth reaction proceeded unstably and an initiation reaction was promoted, so that it was impossible to control the polymerization reaction and the polymer was gelated. Further, since a side reaction occurred during the polymerization reaction, phase separation between the polymers occurred and the solution was changed to be opaque.

According to Comparative Examples 1 and 2, the weight average molecular weights measured at the same conversion ratio were smaller than the weight average molecular weight of Example. This is because an initiation reaction is initiated at fewer sites as compared with the conventional ATRP, and, thus, it is possible to polymerize a longer graft chain with the same input amount of a monomer as described above.

Further, it was evaluated that in Example 1 where the catalytic reducing agent was additionally input, a polymerization rate was gradually increased over time.

According to the present application, by additionally inputting a catalytic reducing agent that reduces an inactivated metal complex compound catalyst to an activated metal complex compound catalyst, it is possible to provide a polymer polymerized at a high conversion ratio of a monomer.

What is claimed is:
1. A polymer preparing method comprising:
preparing a composition by bringing a catalyst, a ligand, a halogenated polymer compound, and a polymeric monomer into contact with one another; and
additionally adding a catalytic reducing agent to the composition,
wherein the catalyst comprises at least one compound selected from the group consisting of Cu(0), Fe(0), Cu$_2$Te, Cu$_2$Se, Cu$_2$S, and Cu$_2$O.

2. The method of claim 1, wherein the catalytic reducing agent is additionally input when a conversion ratio of the polymeric monomer is 10% or more.

3. The method of claim 1, wherein the catalytic reducing agent is input in an amount of 10 parts to 2000 parts by weight with respect to 100 parts by weight of the catalyst.

4. The method of claim 1, wherein the catalyst further includes a compound represented by the following Chemical Formula 1:

Cu(II)X$_2$/L        [Chemical Formula 1]

where, in Chemical Formula 1, X represents a halogen element and L represents a ligand.

5. The method of claim 1, wherein the catalytic reducing agent is an organic reducing agent capable of donating electrons or an inorganic reducing agent capable of donating electrons.

6. The method of claim 5, wherein the organic reducing agent includes one or more selected from the group consisting of peroxides, azo compounds, ascorbic acid, monosaccharide compounds, phenol compounds, amine compounds, and hydrazine compounds.

7. The method of claim 5, wherein the inorganic reducing agent includes at least one selected from the group consisting of metal compounds or zerovalent metals.

8. A polymer preparing method comprising:
forming a mixture by mixing a solvent, a halogenated polymer compound, a polymeric monomer, a catalyst, and a ligand; and
polymerizing the polymeric monomer with the halogenated polymer compound by the polymer preparing method according to claim 1,
wherein polymerizing the polymeric monomer with the halogenated polymer compound includes reducing an inactivated metal complex compound catalyst to an activated metal complex compound catalyst by additionally adding a catalytic reducing agent,
wherein the catalyst comprises at least one compound selected from the group consisting of Cu(0), Fe(0), Cu$_2$Te, Cu$_2$Se, Cu$_2$S, and Cu$_2$O.

9. The method of claim 8, wherein the inactivated metal complex compound catalyst is a compound represented by the following Chemical Formula 1 and the activated metal complex compound catalyst is a compound represented by the following Chemical Formula 2:

Cu(II)X$_2$/L        [Chemical Formula 1]

Cu(I)X/L        [Chemical Formula 2]

where, in Chemical Formula 1 and Chemical Formula 2, X represents a halogen element and L represents a ligand.

10. The method of claim 8, wherein the halogenated polymer compound includes one or more selected from the group consisting of polyvinylidene fluoride, polyvinylidene chloride, trifluoropolyethylene, tetrafluoropolyethylene, hexafluoropolyethylene, 1,2-difluoropolyethylene, chlorofluoropolyethylene, polyethylene chloride or polypropylene chloride, polyvinylidene fluoride-co-chlorotrifluoroethylene, polyvinyl chloride, polychlorotrifluoroethylene, polydichlorodifluoromethane, polyvinylidenedichloride, and copolymers of two or more of the foregoing polymer compounds.

11. The method of claim 8, wherein the polymeric monomer includes an unsaturated vinyl group and is a monomer capable of being polymerized by radical polymerization.

12. The method of claim 11, wherein the polymeric monomer includes one or more selected from the group consisting of alkyl (meta)acrylate having 1 to 12 carbon atoms, styrene, cycloalkyl (meta)acrylate having 1 to 12 carbon atoms, sulfoalkyl (meta)acrylate having 1 to 12 carbon atoms, acrylo nitrile, polyoxyethylene (meta)acrylate, poly(ethyleneglycol) methylether (meta)acrylate, (2-acetoacetoxy)ethyl (meta)acrylate, (meta)acrylamide, N-vinylpyrrolidone, and their derivatives.

13. The method of claim 8, wherein the polymerizing is carried out at a temperature in a range of 25° C. to 200° C. for 0.1 to 100 hours.

14. The method of claim 8, the method further comprising:
terminating a polymerization reaction after the polymerizing.

* * * * *